(12) United States Patent
Marko et al.

(10) Patent No.: US 12,097,088 B2
(45) Date of Patent: Sep. 24, 2024

(54) FIXING PIN SUPPORT FOR DENTAL PROSTHESES AND METHOD OF THE MANUFACTURING THEREOF

(71) Applicant: STRAUMANN HOLDING AG, Basel (CH)

(72) Inventors: Rebic Marko, Munich (DE); Sattler Maximilian, Munich (DE); Dietz Sören, Wörth (DE); Hudeczek Ernst, Dachau (DE)

(73) Assignee: STRAUMANN HOLDING AG, Basel (CH)

( * ) Notice: Subject to any disclaimer, the term of this patent is extended or adjusted under 35 U.S.C. 154(b) by 6 days.

(21) Appl. No.: 16/968,324

(22) PCT Filed: Aug. 30, 2018

(86) PCT No.: PCT/EP2018/073400
§ 371 (c)(1),
(2) Date: Aug. 7, 2020

(87) PCT Pub. No.: WO2019/154531
PCT Pub. Date: Aug. 15, 2019

(65) Prior Publication Data
US 2021/0093423 A1   Apr. 1, 2021

(30) Foreign Application Priority Data
Feb. 7, 2018 (EP) .................... 18155606

(51) Int. Cl.
*A61C 8/00* (2006.01)
*A61C 1/08* (2006.01)

(52) U.S. Cl.
CPC ............ *A61C 8/0028* (2013.01); *A61C 1/084* (2013.01); *A61C 8/0051* (2013.01); *A61C 8/0062* (2013.01)

(58) Field of Classification Search
CPC ....... A61C 8/00; A61C 8/0028; A61C 8/0051; A61C 8/0069; A61C 8/0048; A61C 8/0063; A61C 1/08; A61C 1/084; A61C 13/01
See application file for complete search history.

(56) References Cited

U.S. PATENT DOCUMENTS 6,994,547 B1 *  2/2006  Sethi ................. A61C 8/005
                                                   433/172
2005/0043736 A1 *  2/2005  Mathieu ............ A61B 17/8047
                                                   606/288

(Continued)

FOREIGN PATENT DOCUMENTS

CN   101636124 A   1/2010
CN   101744661 A   6/2010
(Continued)

OTHER PUBLICATIONS

Jul. 29, 2021 Office Action issued in Chinese Patent Application No. 201880088834.9.

(Continued)

*Primary Examiner* — Cris L. Rodriguez
*Assistant Examiner* — Sydney J Pulvidente
(74) *Attorney, Agent, or Firm* — Oliff PLC

(57) ABSTRACT

An improved fixing pin support for a dental prosthesis in order to be able to connect the dental prosthesis to a jaw by means of fixing pins which can each be moved through a guide bore in the fixing pin support. The improved fixing pin support has a guide sleeve separate from it which can be temporarily fitted over the fixing pin support so that the guide bore can be formed in the fixing pin support through a guide channel in the guide sleeve, by precise guidance of a drill. After this, the guide sleeve can be removed from the fixing pin support.

28 Claims, 8 Drawing Sheets

(56) References Cited

U.S. PATENT DOCUMENTS

| | | |
|---|---|---|
| 2006/0029907 A1 | 2/2006 | Linder |
| 2010/0105005 A1 | 4/2010 | Bulloch et al. |
| 2011/0004254 A1* | 1/2011 | Beger ............... A61B 17/1728 606/289 |
| 2014/0099599 A1* | 4/2014 | Harrison ............. A61C 8/0089 433/173 |
| 2014/0178839 A1* | 6/2014 | Berger ............... A61C 13/2255 433/173 |
| 2017/0252126 A1* | 9/2017 | Llop ................... A61C 8/0027 |
| 2018/0153563 A1* | 6/2018 | Kuun ..................... A61C 1/084 |
| 2019/0090925 A1* | 3/2019 | Detweiler ......... A61B 17/8076 |

FOREIGN PATENT DOCUMENTS

| | | |
|---|---|---|
| CN | 102905644 A | 1/2013 |
| CN | 103338922 A | 10/2013 |
| CN | 105338922 A | 2/2016 |
| CN | 107530148 A | 1/2018 |
| DE | 102010060641 A1 | 5/2012 |
| FR | 2889050 A1 | 2/2007 |
| TW | 201429450 A | 8/2014 |
| WO | 2013/004606 A1 | 1/2013 |
| WO | 2014/056104 A1 | 4/2014 |

OTHER PUBLICATIONS

Aug. 11, 2020 International Preliminary Report on Patentability issued in International Patent Application No. PCT/EP2018/073400.

Nov. 6, 2018 Written Opinion issued in International Patent Application No. PCT/EP2018/073400.

Apr. 1, 27, 2022 Office Action issued in Brazilian Patent Application No. BR112020014774-5. .

* cited by examiner (State of the art)

(State of the art)

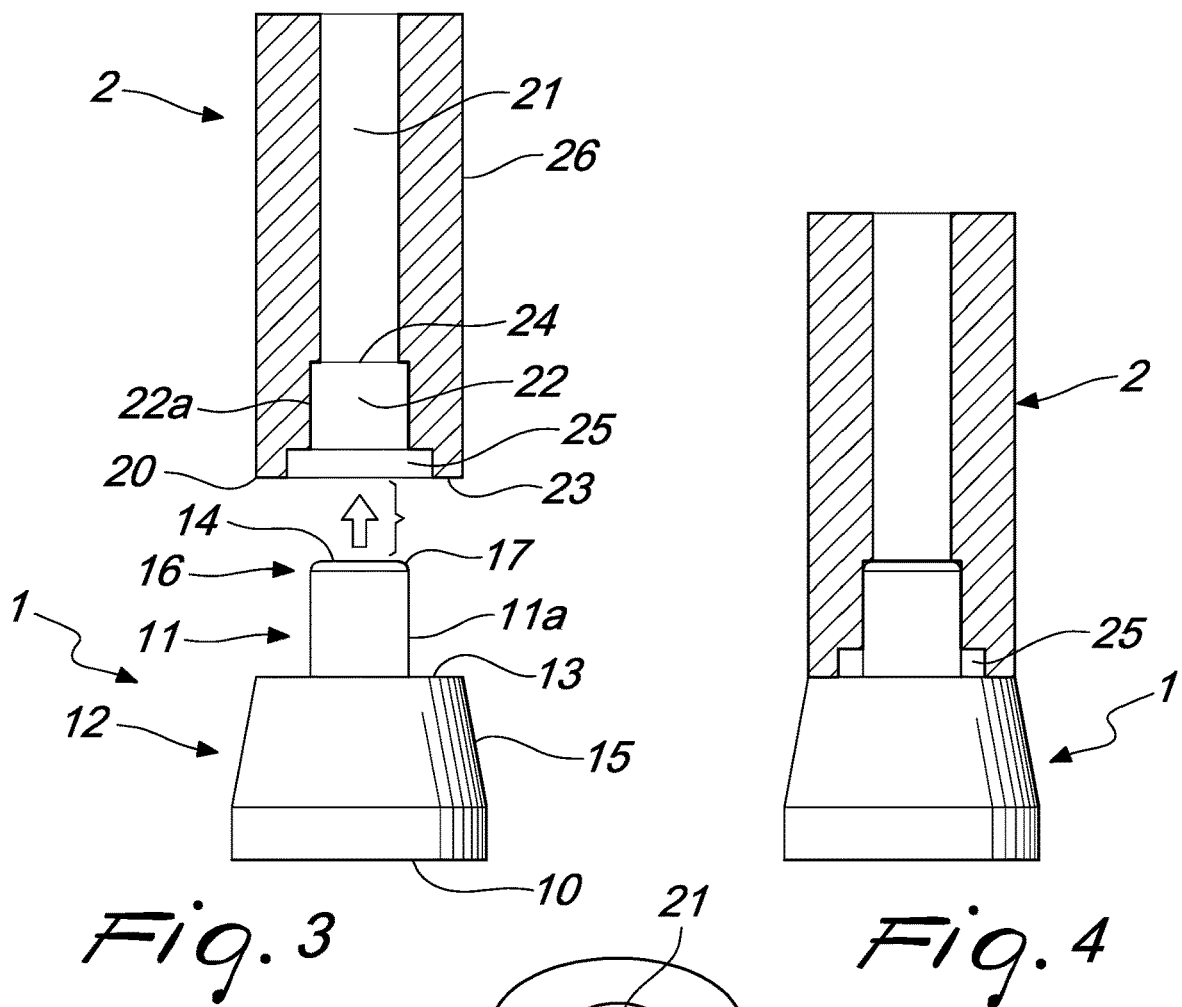
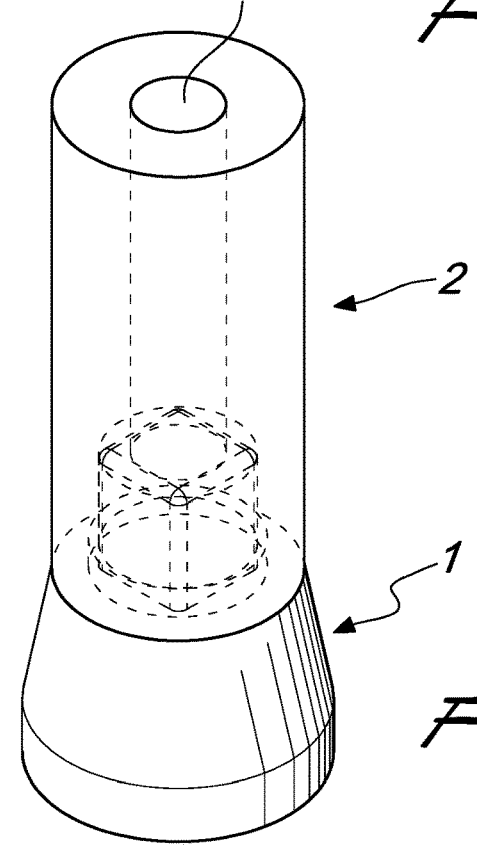
Fig. 3
Fig. 4
Fig. 5

FIXING PIN SUPPORT FOR DENTAL PROSTHESES AND METHOD OF THE MANUFACTURING THEREOF

TECHNICAL FIELD

The present invention relates to an improved fixing pin support for dental prostheses so that the dental prosthesis can temporarily be anchored in the jaw of a patient by means of such fixing pins, and to a method of manufacturing such fixing pin supports.

BACKGROUND

In the state of the art, dental prostheses, such as they are by way of example shown in FIG. 1 and FIG. 2, are provided with fixing pin supports which are stably integrated in the dental prosthesis and which have a guide bore, so that the prosthesis can temporarily be anchored in the jaw for performing an adjustment in the mouth of the patient. In the patient's mouth, a respective fixing pin is then advanced or screwed into the jaw bone through the respective guide bore in order to temporarily anchor the dental prosthesis to the jaw and perform an adjustment, for instance, of dental surfaces and/or orientations of individual parts of the dental prosthesis.

Commonly, the corresponding fixing pin supports are provided with guide bores which have been pre-drilled so that the supports can accordingly be inserted or adhesively secured to the dental prosthesis. The corresponding holes in the jaw, where the fixing pins are slid or screwed into before the adjustment, have preferably been pre-formed separately in the jaw.

Frequently, it is difficult to provide the guide bore in the respective fixing pin support with sufficient precision, where a drill is to be guided as precisely as possible into the support, and only along the longitudinal axis of the fixing pin support. If the orientation and arrangement of the guide bore is not performed precisely enough, the fixing pin will later not align with the bore which has already been prepared in the jaw in order to accommodate the fixing pin therein. Therefore, sometimes slot-shaped fixing pin supports are also used for which, at first, only an orientation of the guide slot needs to be precisely predetermined. However, in the slot-shaped fixing pin support, the fixing pin can only be retained in one dimension, leading to a loss of precise retention of the dental prosthesis in the jaw.

If, on the other hand, common sleeve-shaped fixing pin supports are used, they must, on the one hand, be sufficiently stiff to guide the fixing pin as precisely as possible, and, on the other hand, not all too stiff, for instance in the case of metal supports; so that after adjustment performed in the mouth, protruding parts thereof can be removed easily by abrasive finishing.

SUMMARY

The task of the invention, in order to eliminate disadvantages of the state of the art, therefore consists in the provision of improved fixing pin supports for a dental prosthesis to fix the same in the mouth of a patient by means of a respective fixing pin, where the guide bores can be applied as precisely and easily as possible and protruding parts can be removed as easily as possible after adjustments of the dental prosthesis have been made in the mouth of the patient. Preferably, an improved method of manufacturing the dental prosthesis with the fixing pin supports and of subsequently removing protrusions, after fixation and adaptation in the mouth of the patient have been performed, is also to be provided.

The abovementioned task is solved by a device and a method disclosed herein. Other advantageous embodiments of the invention are described below.

According to the invention, a fixing pin support with a matching guide sleeve (2) for a dental prosthesis is provided, the fixing pin support being adapted to be integrated, or able to be integrated, in the dental prosthesis so as to be connectable along its longitudinal axis, by means of a corresponding fixing pin, to a jaw of a patient which has pre-drilled holes the fixing pin, which is slidable through the fixing pin support, can protrude into so as to temporarily anchor the dental prosthesis in the jaw. A first embodiment of the fixing pin support comprises:

- a base portion which is adapted to be integrally connectable to the dental prosthesis or which is monolithic with the prosthesis; and
- an exterior adapter portion which is integral with the base portion and extends along the longitudinal axis from the base portion with an exterior adapter length to an exterior end with an exterior adapter cross-section, the exterior end of the exterior adapter portion on the dental prosthesis facing away outwards from the patient;
- the guide sleeve being formed longitudinally and sleeve-like along a guide sleeve longitudinal axis with an interior guide channel which is open to the outside on both sides; and having at a first end along the guide sleeve longitudinal axis a cup-shaped interior adapter portion with an interior adapter length and an interior adapter cross-section;
- the interior adapter portion with the interior adapter length and the interior adapter cross-section and the exterior adapter portion with the exterior adapter length and the exterior adapter cross-section matching each other such that they can be fitted together and form a connection stable enough so that a hole can be drilled with a predefined tolerance through the guide sleeve in the fixing pin support, which hole the fixing pin fits into.

A substantial advantage of the novel fixing pin support is that the fixing pin support has an exterior adapter portion adapted for the guide sleeve to be fitted over the same so that an adequately precise bore can be drilled in the fixing pin support through the guide channel of the guide sleeve, forming a guiding bore for the respective fixing pin.

Advantageously, the fixing pin support can also be made of a softer material than the guide sleeve; for instance, the support can be made of a plastic and the guide sleeve of a metal. This allows, on the one hand, a good stability of the harder guide sleeve for drilling a hole in the fixing pin support. On the other hand, by making the fixing pin support of a softer material than the guide sleeve, laterally protruding exterior adapter portions can be more easily removed after adaptation of the dental prosthesis in the mouth of the patient, for instance by milling or grinding. Processing in manufacturing of the fixing pin support is therefore easier and more precise than in the state of the art; and subsequent removal of the laterally protruding portions of the fixing pin support, which are now the exterior adapter portions, for instance by milling or grinding, has also been simplified. A certain length of the guiding bore must be ensured, anyway, to retain the fixing pin securely against swiveling, and so that the guide bore also does not break.

By elongating the fixing pin support along the longitudinal axis by means of the guide sleeve, the drill can be guided much more precisely in order to produce the guiding bore in the fixing pin support.

Preferably, the guide sleeve can be reused after having been removed from the fixing pin support.

In a second embodiment of the invention, the fixing pin support can comprise a guiding portion which extends along the longitudinal axis and emcompasses it on all sides, the guiding portion having at least one guiding surface and one guiding portion length along the longitudinal axis; and a base portion integrally or monolithically connected to the guide portion extends laterally away from the guide portion outside the guiding surface, the base portion being integrally connectable to the dental prosthesis or monolithic with the dental prosthesis;

the guide sleeve being formed longitudinal and sleeve-like with an interior guide channel along a guide sleeve longitudinal axis; the channel being open to the outside on both sides and having in a portion along the guide sleeve longitudinal axis an interior, cup-shaped interior adapter portion with an interior adapter cross-section and an interior adapter length; and the interior adapter portion with the interior adapter length and the interior adapter cross-section and the guiding portion with the guiding surface and the guiding portion length matching one another such that they can be plugged onto one another along the longitudinal axis and along the guide sleeve longitudinal axis, secure against rotation, forming a connection so that a hole can be drilled in the fixing pin support through the guide sleeve the fixing pin fits into.

The second embodiment of the fixing pin support with the matching guide sleeve has the same advantages as the first embodiment, namely that the guiding portion is formed such that the guide sleeve can be plugged onto it so that through the guide channel of the guide sleeve, a correspondingly precise bore can be formed in the fixing pin support, the guide bore being formed for the fixing pin.

Advantageously, in this case as well, the fixing pin support can be made of a softer material than the guide sleeve, for instance of a plastic, while the guide sleeve is made, for instance, of metal. This allows, on the one hand, a good stability of the harder guide sleeve for drilling a hole in the fixing pin support. On the other hand, by making the fixing pin support, and especially the guiding portion or at least the transition between the guiding portion and the base portion, of a softer material than the guide sleeve, laterally protruding exterior adapter portions can be more easily removed after adaptation of the dental prosthesis in the mouth of the patient, for instance by milling or grinding.

Other preferred embodiments are disclosed in the detailed specification.

The methods of manufacturing the dental prosthesis with the fixing pin supports disclosed herein show that use of the fixing pin supports with the plug-on guide sleeves makes the manufacturing process easier and more precise than is the case in the state of the art.

BRIEF DESCRIPTION OF THE DRAWINGS

Preferred embodiments of the present invention are shown in the following figures and in a detailed specification, but are not intended to limit the invention.

In the figures

FIG. 3 shows a lateral cross-sectional view of a preferred first embodiment of the fixing pin support of a guide sleeve, which is arranged directly above the fixing pin support along a common longitudinal axis, but in a non-connected state; the fixing pin support having an interior adapter portion formed such as to fit precisely over an exterior adapter portion of the fixing pin support shown directly below it; in a lower end portion of the interior adapter portion, the guide sleeve has an annular recess with a larger cross-section than that of the matching exterior adapter portion;

FIG. 4 shows a lateral cross-section of the preferred first embodiment of the fixing pin support and the guide sleeve in FIG. 3; with the fixing pin support and the guide sleeve being in a connected state; the fixing pin support having an interior adapter portion formed such as to fit precisely over an exterior adapter portion of the fixing pin support shown directly below it;

FIG. 5 shows a perspective view of the fixing pin support and the guide sleeve according to FIG. 4, the guide sleeve having been plugged onto and thus connected to the support;

DETAILED DESCRIPTION OF EMBODIMENTS

Figure 1:
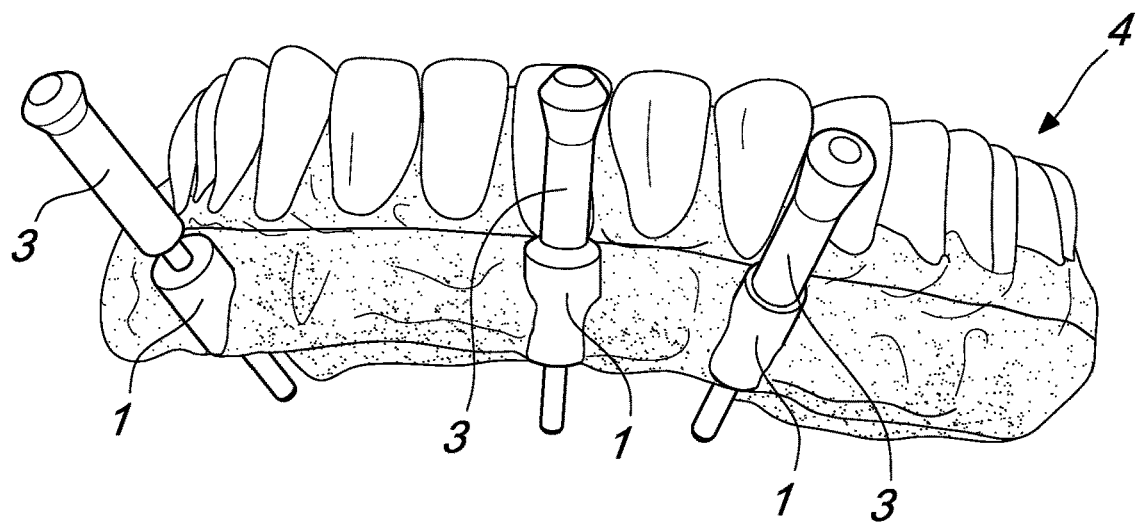
FIG. 1 shows a perspective lateral view of a dental prosthesis in which three fixing pin supports have been inserted according to the state of the art, into which respective fixing pins have been introduced; end portions of the fixing pin support which protrude outwards can be seen.
Figure 2:
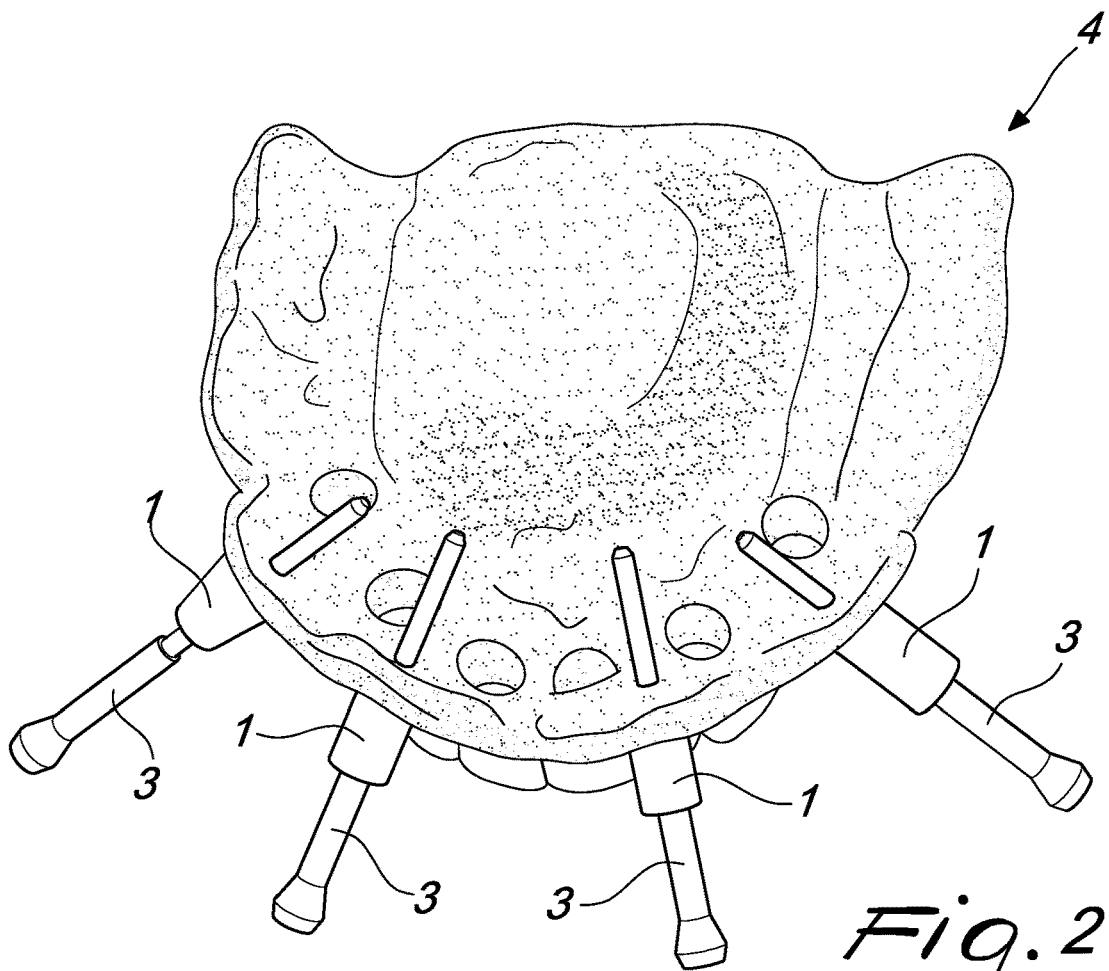
FIG. 2 shows a perspective view from below of the dental prosthesis in FIG. 1, in which three fixing pin supports have been inserted according to the state of the art; the fixing pins can be seen which protrude inwards towards the jaw (not shown)

In FIG. 1, a dental prosthesis of the state of the art is shown in a perspective lateral view, with fixing pin supports 1 being stably inserted in the dental prosthesis 4 and one fixing pin 3 being inserted in each respective fixing pin support 1. FIG. 2 shows the same dental prosthesis 4 as FIG. 1, with the integrated fixing pin supports 1 and the fixing pins 3, in a perspective view from below. As mentioned above, the fixing pin supports 1, which have one guide bore each, are used for temporarily fixing the dental prosthesis 4 in the mouth of a patient and, more precisely, to the jaw of the patient, by driving the fixing pins 3 through the fixing pin supports 1 into the jaw bone, where preferably corresponding holes have already been pre-drilled. After inserting and temporarily fixing the dental prosthesis 4 to the jaw, the dental prosthesis 4 can be adequately adapted to the mouth and the dental structure of the patient. After such an adaptation has been performed, the dental prosthesis 4 is removed from the mouth, and portions or parts of the fixing pin supports 1 which protrude laterally on the dental prosthesis 4 are removed, for instance by milling or grinding, and the guide bores are preferably filled in. Preferably, the dental prosthesis 4 is then laterally smoothed and veneered for subsequent permanent use. This is as far as the state of the art goes.

The fixing pin support 1 according to the present invention is adapted to be integrated or able to be integrated in a dental prosthesis 4, for instance by adhesive bonding, casting, integral molding as an imprint or by full or partial milling from a block or from an imprint. The fixing pin support 1 is formed along a longitudinal axis so that the fixing pin 3 can be completely inserted along the longitudinal axis in order to establish a connection to the jaw of the patient.

The fixing pin support 1 according to the invention comprises, in a first preferred embodiment in FIGS. 3 and 4, a base portion 12 which is adapted to be integrally connectable to the dental prosthesis or monolithic with the dental prosthesis 4. Preferably, the base portion 12 is rotationally symmetric about the longitudinal axis. Preferably, the base portion 12 is formed along the longitudinal axis, from a first end 10 designed to be arranged closest to the jaw in the dental prosthesis 4, to a second portion which appears laterally on the outside of the dental prosthesis 4, by a cylindrical portion and an adjacent truncated cone-shaped portion. The base portion 12 has a first lateral surface 15 which is preferably truncated cone-shaped and tapers from the first end 10 to the second portion.

The base portion 12 has an exterior adapter portion 11 which is integrally connected to the base portion 12 and extends along the longitudinal axis from the base portion 12 to an exterior end 16 with an exterior adapter length and an exterior adapter cross-section. In other words, the exterior adapter portion 11 extends from the second portion of the base portion 12 to the exterior end. The exterior adapter cross-section can be shaped either homogeneously or heterogeneously. For instance, the exterior adapter portion 11 can be formed slightly conically from the second portion to the exterior end 16, and/or it can have a circumferential rounded upper edge at the exterior end. Preferably, the exterior adapter portion 11 is rod-, bolt-, pin- or tube-shaped and has an exterior lateral adapter surface 11a. Preferably, the exterior lateral adapter surface 11a extends over the exterior adapter length at least partly in parallel to the longitudinal axis. Preferably, the exterior lateral adapter surface 11a extends over the exterior adapter length at least partially at an angle of 0.01-0.1° conically to the longitudinal axis. For clarification, it is pointed out that the exterior end 16 of the exterior adapter portion 11 is the end which is arranged farthest on the outside laterally during an integration in the dental prosthesis 4.

Figure 10:
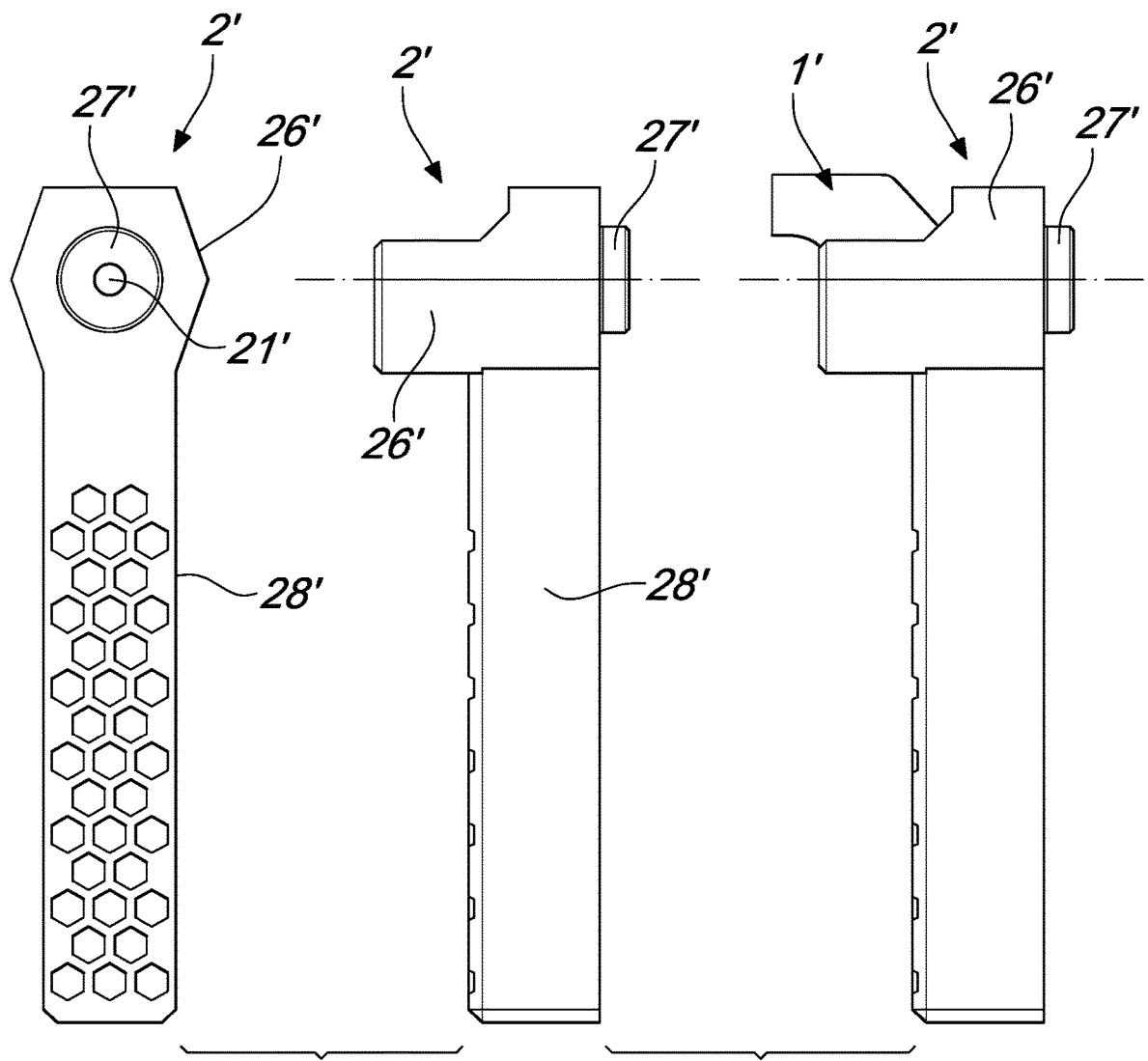
FIG. 10 shows embodiment of the guide sleeve with the laterally protruding support arm grip according to FIG. 9, which is adapted to the corresponding fixing pin support according to FIG. 8; on the left, a top view in the direction of a longitudinal axis of the guide sleeve is shown; in the middle, a lateral view rotated by 90° where the longitudinal axis is rotated by 90° to the right; and on the right, the same lateral view as in the middle, but with a guide portion of the fixing pin support inserted therein.

In addition, the fixing pin support 1 according to the invention has a separate guide sleeve 2 with a sleeve-shape along a longitudinal guide sleeve axis and with an interior guide channel 21 which is open to the outside on both sides. At a first end 20 along the longitudinal guide sleeve axis, the guide sleeve 2 has a cup-shaped interior adapter portion 22 with an interior adapter length and an interior adapter cross-section. The interior cup-shaped adapter portion 22 also has an interior lateral adapter surface 22a. Preferably, the interior lateral adapter surface 22a is formed parallel to the longitudinal guide sleeve axis or with a deviation of 0.01-0.1° thereto. For purposes of clarity, it is pointed out that the first end 20 of the guide sleeve 2 is defined as the end which first comes in contact with the exterior adapter cross-section 11 when the guide sleeve 2 is fitted over the fixing pin support 1. Preferably, the guide sleeve 2 has a laterally extending retaining grip or support arm grip which extends laterally away from the sleeve at an angle of 45°-135° and further preferably 80°-100° to the longitudinal guide sleeve axis so that the guide sleeve 2 can be better retained manually, as shown, for example, in FIG. 10 with the guide sleeve 2' and the support arm grip 28'. Preferably, a support arm grip 28 can also be coaxial or z-shaped coaxial with the guide sleeve longitudinal axis.

The interior adapter portion 22 with the interior adapter length and the interior adapter cross-section and the exterior adapter portion 11 with the exterior adapter length and the exterior adapter cross-section are formed complementary so as to precisely fit together, forming a connection. The fit between the interior adapter portion 22 and the exterior adapter portion 11 is preferably a press fit or a fit with a play of preferably 0-100 μm or more preferably 0-50 μm or even more preferably 0-30 μm or even more preferably 10-30 μm. The fit between the interior adapter portion 22 and the exterior adapter portion 11 is adapted to be stable enough for drilling a hole in the fixing pin support 1, where the fixing pin 3 fits into, through the guide sleeve 2 with a predefined tolerance. Preferably, the tolerance is less than +/−0.5°.

Of course, one or more respective fixing pin supports 1 can be formed in the dental prosthesis 4 where a guide sleeve 2 can be fitted over each of them. It is also possible to fit a separate guide sleeve 2 on each fixing pin support 1 in order to accelerate the process.

Preferably, the fixing pin support 1 is made of a softer material than the guide sleeve 2. Preferably, the fixing pin support 1 is made of a plastic and the guide sleeve of a metal. Preferably, the fixing pin support 1 has, along the longitudinal axis, a first bushing with a bore, the bushing being made of a harder material than the rest of the fixing pin support (1).

Preferably, the exterior adapter portion 11 fits over the interior adapter portion 22 in such a way that they can be separated from one another after having been connected.

Preferably, the base portion 12 of the fixing pin support 1 is integrally connected to the dental prosthesis 4 or molded, screwed in or glued to the same. Alternatively, the fixing pin support 1 is preferably milled or molded together with the dental prosthesis 4 from a base material.

Preferably, the fixing pin support 1 has at its base portion 12, arranged annularly around the exterior adapter portion 11 which extends from the base portion 12, a first end face 13 which extends annularly around the longitudinal axis at a first angle to the same. Preferably, the first end face 13 extends annularly around the longitudinal axis from the exterior adapter portion 11 up to a lateral first surface 15 of the base portion 12. Preferably, the guide sleeve 2 has a third end face 23 annular about the guide sleeve longitudinal axis, which end face is formed at the first end 20 of the guide sleeve 2 between a second exterior lateral surface 26 of the guide sleeve 2 and the interior adapter portion 22 with the first angle to the guide sleeve longitudinal axis. The first end face 13 and the third end face 23 are configured such with respect to each other that when the guide sleeve 2 and the fixing pin support 1 are fitted together, they rest against each other, forming a mutual predefined stop.

Generally, the longitudinal axis of the fixing pin support 1 is preferably coaxial with the guide sleeve longitudinal axis of the guide sleeve 2.

Preferably, the guide sleeve 2 has at its first end 20 a recess 25 which is formed annularly around the guide sleeve longitudinal axis between the third end face 23 and the interior adapter portion 22 such that the recess widens at an exterior rim portion of the interior adapter portion 22 at the first end 20 so that when the guide sleeve 2 and the fixing pin support 1 are fitted together, the recess 25 forms a cavity between the guide sleeve 2 and the fixing pin support 1. The cavity has the width of the recess vertically to the guide sleeve longitudinal axis, and a recess depth along the guide sleeve longitudinal axis which is smaller than the interior adapter length. Preferably, the recess depth is 0.1-1 mm and further preferably 0.1-0.5 mm. The recess 25 is intended for receiving a slant, or bevel, of the exterior adapter portion 11 with respect to the first end face 13 in order to ensure the abutment between the first 13 and the third end face.

Preferably, the fixing pin support 1 has, at the exterior end 16 of the exterior adapter portion 11, a second end face 14 with a second angle to the longitudinal axis. The guide sleeve 2 preferably has a fourth end face 24 formed as a slant between the interior adapter portion 22 and the guide channel 21 with the second angle to the guide sleeve longitudinal axis. The second end face 14 and the fourth end face 24 are formed such with respect to each other that when the guide sleeve 2 and the fixing pin support 1 are fitted together, they rest against each other and form a predefined abutment with respect to each other.

Preferably, the first angle to the longitudinal axis and to the guide sleeve longitudinal axis is a right angle or an angle within a range of 60-90°.

Preferably, the second angle to the longitudinal axis and to the guide sleeve longitudinal axis is a right angle or an angle within a range of 60-90° or of 30-60°.

Preferably, the fixing pin support 1 and the guide sleeve 2 are adapted to contact each other in the fitted state exclusively at the exterior adapter portion 11, the interior adapter portion 22 and/or at the first 13, the second 14, the third 23 and/or the fourth end face 24. Preferably, the first lateral surface 15 of the fixing pin support 1 stays out of contact with the guide sleeve 2 in the fitted state.

Preferably, the exterior adapter portion 11 has, at a transition area between the second end face 14 and the exterior lateral adapter surface 11a, an exterior adapter end edge 17 forming a rounded area or a bevel at the second end face 14 so that the guide sleeve 2 can be fitted more easily over the exterior adapter portion 11 in a self-finding manner. Preferably, additional edges or rims of the exterior adapter portion 11 are rounded or have at least one bevel on the exterior lateral adapter surface 11a, so that the interior adapter portion 22 can be better fitted over the exterior adapter portion 11.

Figure 6A:
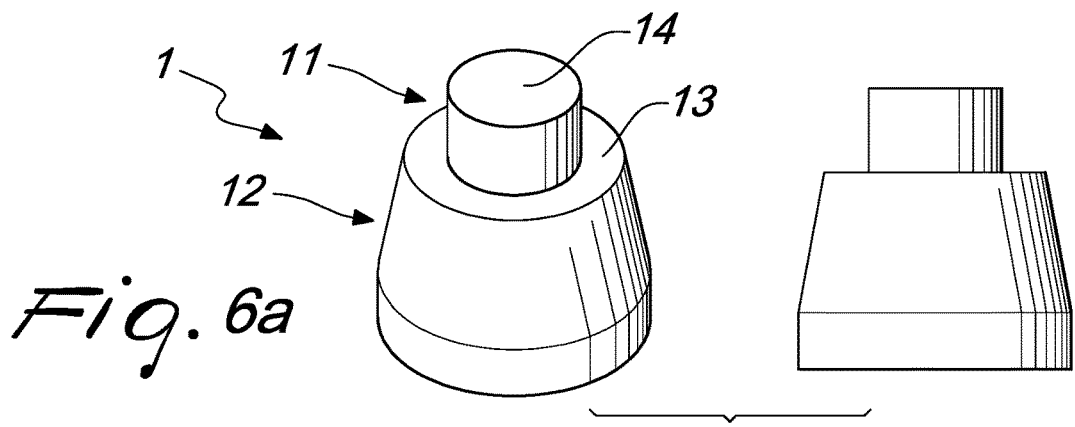
FIG. 6a shows, on the left, a perspective view and on the right, a lateral view of a second preferred fixing pin support with a round exterior adapter cross-section.
Figure 6B:
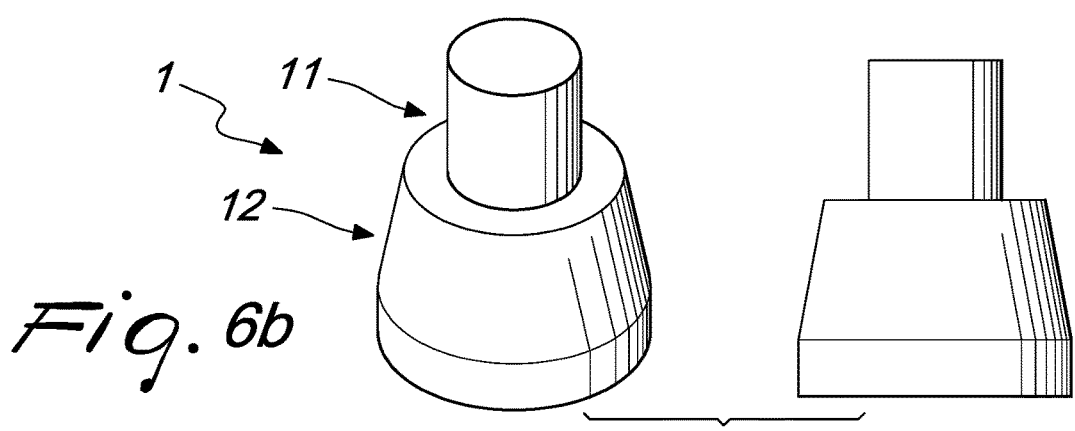
FIG. 6b shows, on the left, a perspective view and on the right, a lateral view of a third preferred fixing pin support with a round exterior adapter cross-section.
Figure 6C:
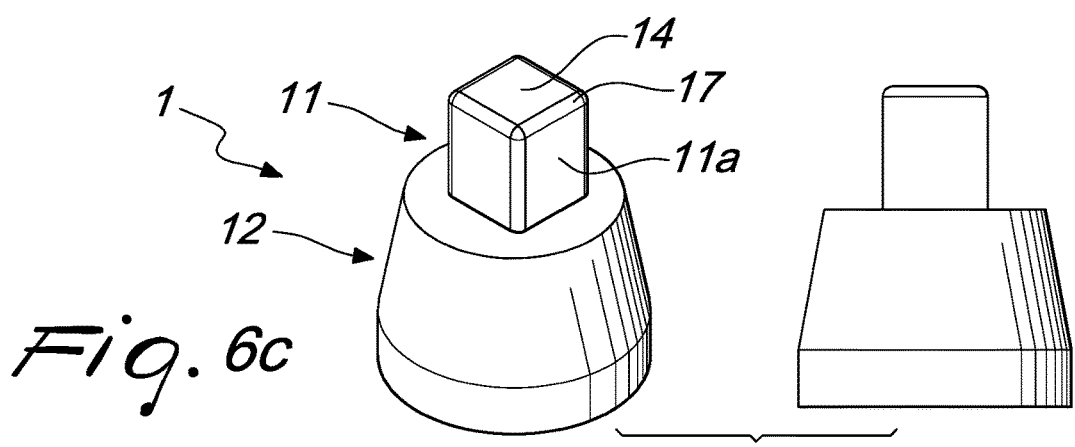
FIG. 6c shows, on the left, a perspective view and on the right, a lateral view of a fourth preferred fixing pin support with a square exterior adapter cross-section and a rounded exterior adapter front edge.
Figure 6D:
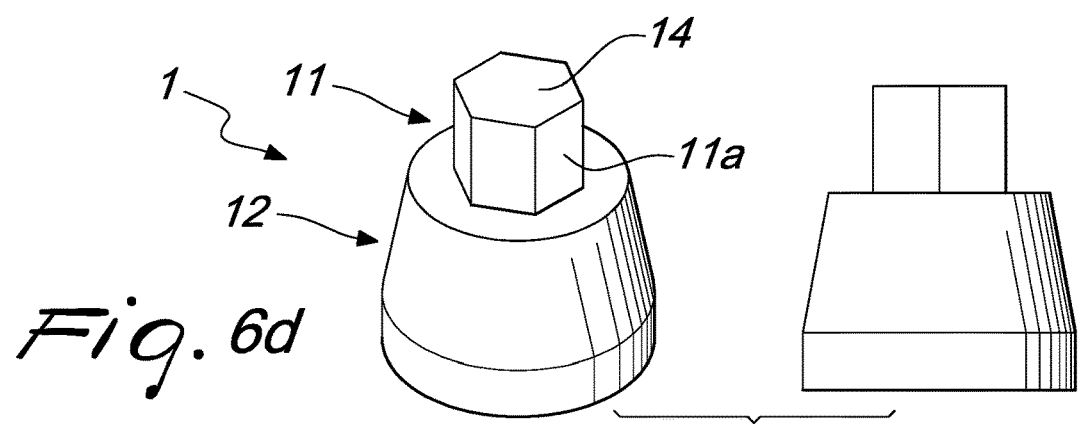
FIG. 6d shows, on the left, a perspective view and on the right, a lateral view of a fifth preferred fixing pin support with a hexagonal exterior adapter cross-section.
Figure 7:
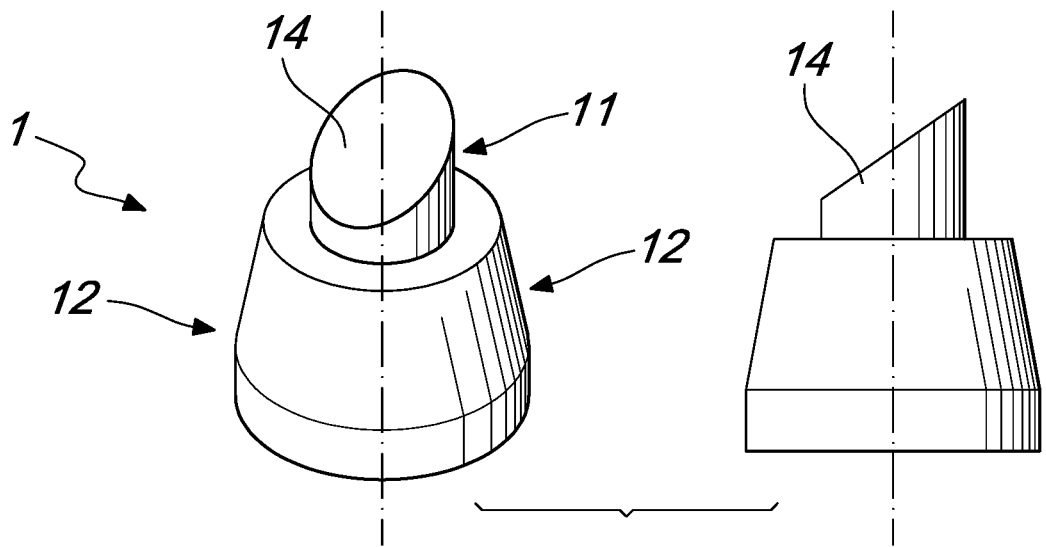
FIG. 7 shows, on the left, a perspective view and on the right, a lateral view of a sixth preferred fixing pin support with a round exterior adapter cross-section and an upper second front edge at an angle of 55° to the longitudinal axis.

Preferably, the exterior adapter cross-section and the corresponding interior adapter cross-section are secure against rotation about the longitudinal axis and the guide sleeve longitudinal axis to form an anti-twist protection between the fixing pin support 1 and the guide sleeve 2. The exterior adapter cross-section and the interior adapter cross-section can have such an anti-twist protection along the longitudinal axis and the guide sleeve longitudinal axis over the entire exterior adapter length or over only part of it. The protection can be formed, for instance, by a square, rectangular, oval or polygonal shape of the respective cross-section. A spline connection between the exterior lateral adapter surface 11a and the interior lateral adapter surface 22a is another example. Alternatively or in addition, security against rotation can also be achieved by forming the second end face 14 and the fourth end face 24 at an incline to the longitudinal axis and to sleeve longitudinal axis; FIG. 7 shows a preferred embodiment of the fixing pin support 1, where the second end face 14 intersects the longitudinal axis at a slanted angle. Preferred embodiments of the fixing pin supports 1 with polygonal exterior adapter cross-sections as anti-twist protection are shown by way of example in FIGS. 6c and 6d. In contrast, the preferred embodiments of the fixing pin supports 1 in FIGS. 6a and 6b have no exterior adapter cross-sections which are secured against rotation.

Figure 8:
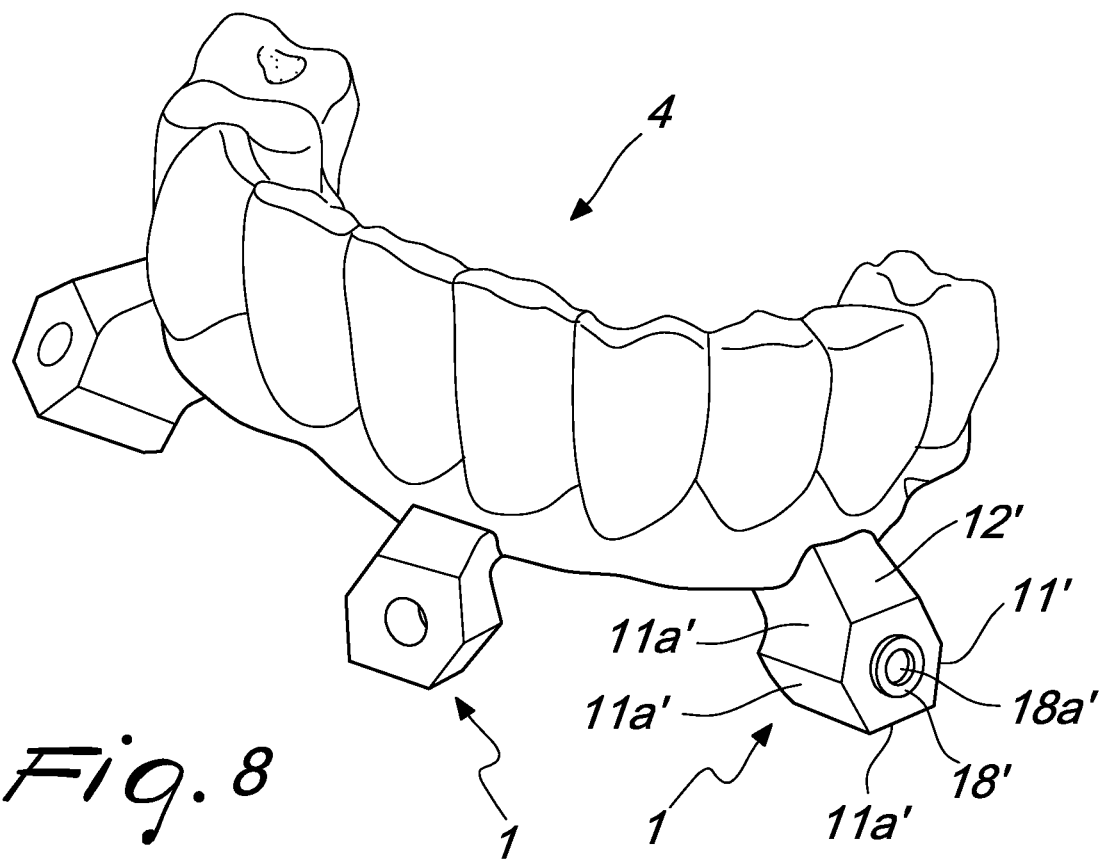
FIG. 8 shows a perspective lateral view of a different dental prosthesis with a different preferred embodiment of the fixing pin supports and the sleeve, where on the dental prosthesis, three fixing pin supports with a respective bore along the respective longitudinal axis have been applied; and the front right fixing pin support having an additional first socket to make the mounting of the fixing pin (not shown) more rigid; it can also be seen that a guiding portion of the respective fixing pin support is connected to the dental prosthesis via a corresponding base portion of the fixing pin support.
Figure 9:
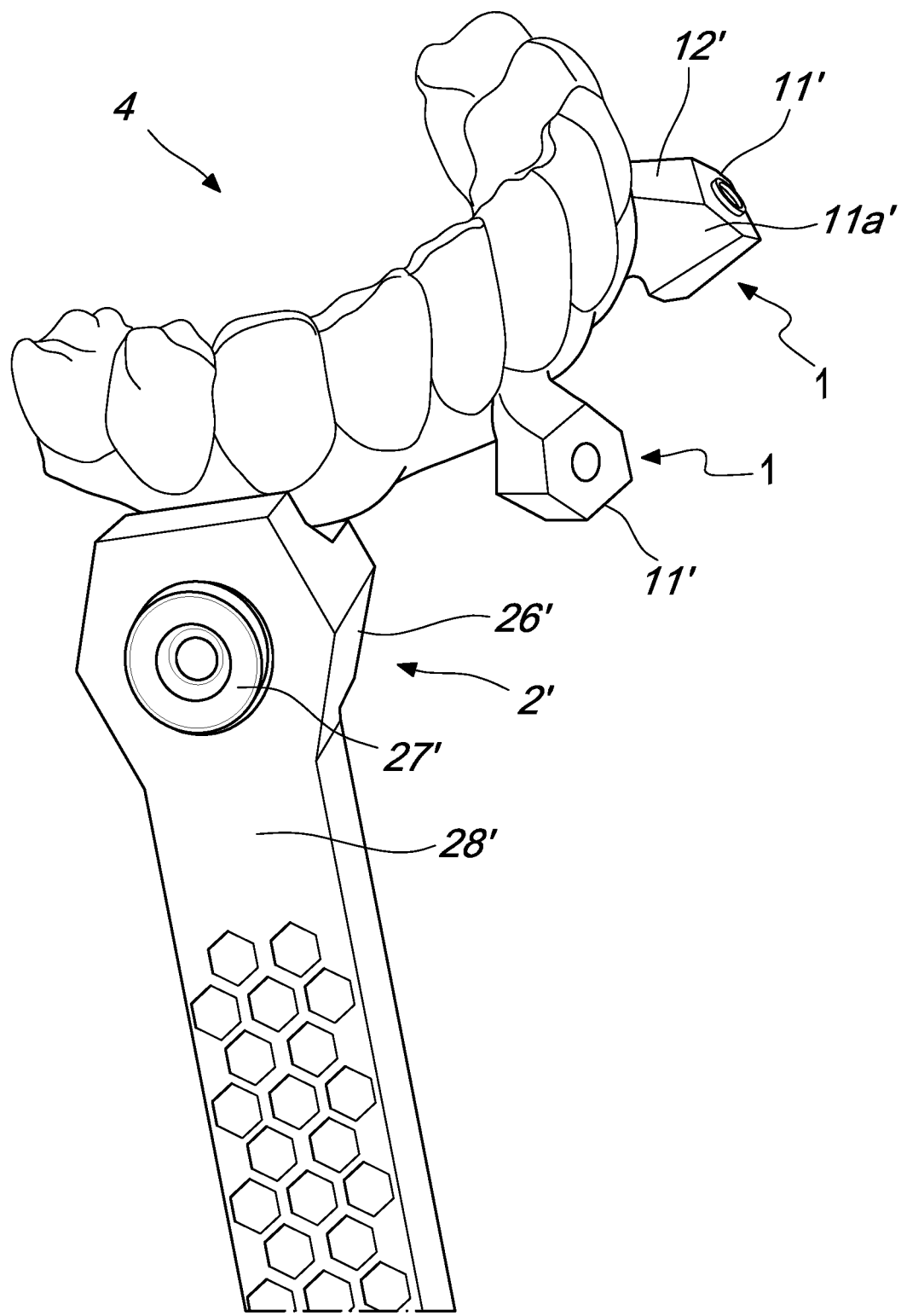
FIG. 9 shows a perspective lateral view of the dental prosthesis with the fixing pin supports according to FIG. 8, where a matching guide sleeve is slid onto one of the fixing pin supports in the direction of the longitudinal axis, the guide sleeve preferably having a support arm grip laterally or transversely to the longitudinal axis in order to be able to manually retain the guide socket.

A preferred second embodiment of the fixing pin support 1' and the corresponding guide sleeve 2' according to the invention has substantially the same features as the first embodiment and is shown by way of example in FIGS. 8-14. In this embodiment, the fixing pin support 1', just like in the first embodiment, is adapted to be able to be integrated or is integrated in another dental prosthesis 4 so as to be connected, along its longitudinal axis, by means of the corresponding fixing pin 3 (in FIGS. 8-13 not shown), to the jaw of a patient which has pre-drilled holes into which the fixing pin 3, which is slidable through the fixing pin support 1, can protrude. By means of the fixing pin 3 which protrudes into the jaw through the fixing pin support 1', the dental prosthesis 4 can temporarily be anchored to the jaw. FIG. 8 shows an exemplary embodiment of the dental prosthesis 4' with three fixing pin supports 1', a first bushing 18' with a bore 18a' being inserted in the right fixing pin supports 1'.

Figure 12:
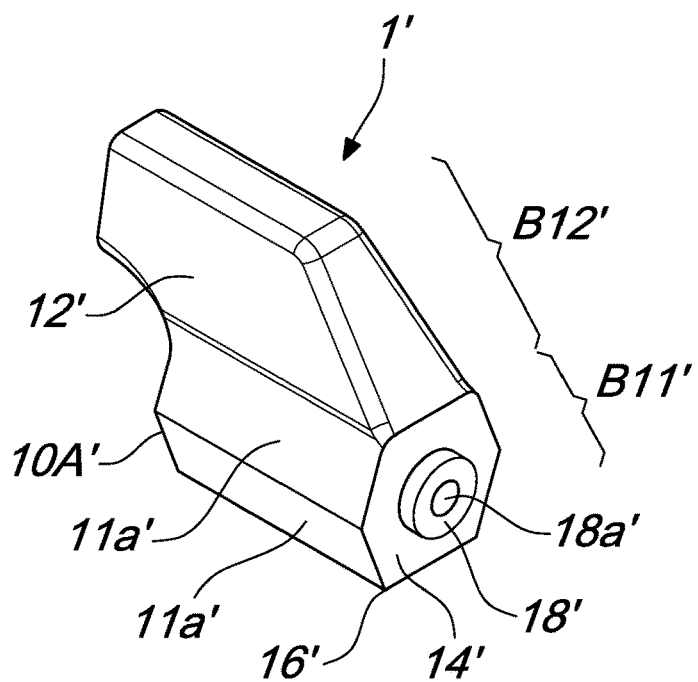
FIG. 12 shows a perspective view of the fixing pin support according to FIGS. 8-11, with the first socket inserted in the guide portion.

The fixing pin support 1' comprises a guide portion 11' which extends along the longitudinal axis and encompasses it on all sides, the guide portion 11' having at least one guiding surface 11a' or two guiding surfaces 11a' opposite to the longitudinal axis and one guide portion length along the longitudinal axis. FIG. 8 shows an example thereof. Preferably, the at least one guiding surface 11a' runs in the direction of the longitudinal axis or at an acute angle thereto from a lower end 10A to an opposite upper end face 14'. For example, the acute angle lies in a range from 0-15° or 0-30°. In FIGS. 8 and 12, the guiding surfaces 11a' are shown by way of example. Preferably, the at least one guiding surface 11a' is planar. In FIG. 12, the area of the base portion 12' is indicated by B12' and the area of the fixing pin support 11' by B11'; the transition between the base portion 12' and the fixing pin support 11' is preferably smooth and only a matter of definition.

The fixing pin support 1' comprises also a base portion 12' which is integrally or monolithically connected to the guide portion 11' and extends laterally away from the guide portion 11' outside the guiding surface 11a'. The base portion 12' is integrally connectable to the dental prosthesis 4 or monolithic with the dental prosthesis 4. Preferably, the base portion 12' is formed as a connecting element between the guide portion 11' and the dental prosthesis 4'. Preferably, the fixing pin support 1' with the guide portion 11' and the base portion 12' is formed such that the fixing pin support 1' extends laterally outward at a dental prosthesis 4'.

The guide sleeve 2' is provided with an interior guide channel 21' along the guide sleeve longitudinal axis, which channel is open to the outside on both sides and has, in a portion along the guide sleeve longitudinal axis, an interior, cup-shaped interior adapter portion 22' with an interior adapter cross-section and an interior adapter length.

The interior adapter cross-section 22' with the interior adapter length and the interior adapter cross-section and the guide portion 11' with the guiding surface 11a' and the guide portion length are formed complementary such that they can be fitted on one another along the longitudinal axis, which coincides with the guide sleeve longitudinal axis, so as to be secure against rotation, forming a connection. Through the guide sleeve 2', a hole can be drilled in the fixing pin support 1' through which the fixing pin 3 can then be inserted. Preferably, the interior adapter cross-section over the interior adapter length is formed at least partially such that the interior lateral adapter surfaces 22a' formed in this manner extend in the direction of the guide sleeve longitudinal axis or at an acute angle thereto.

As with the first embodiments of the fixing pin support, it goes without saying that the dental prosthesis 4 can contain one or more respective fixing pin supports 1' on each of which the guide sleeve 2' can be fitted. To accelerate the process, a separate guide sleeve 2' can also be fitted on each fixing pin support 1'.

Preferably, the interior adapter portion 22' and the guide portion 11' with the at least one guiding surface 11a' are formed, with respect to the interior adapter length, complementary such that an insertion depth along the longitudinal axis of preferably 3-5 mm or further preferably 3-8 mm or even more preferably 5-10 mm results.

Preferably, the interior adapter portion 22' and the guide portion 11' with the at least one guiding surface 11a' are formed complementary to each other by means of slanted or rounded edges such that the slanted or rounded edges allow an easier insertion and/or self-orientation with each other than would be the case without the slanted or rounded edges.

Figure 11:
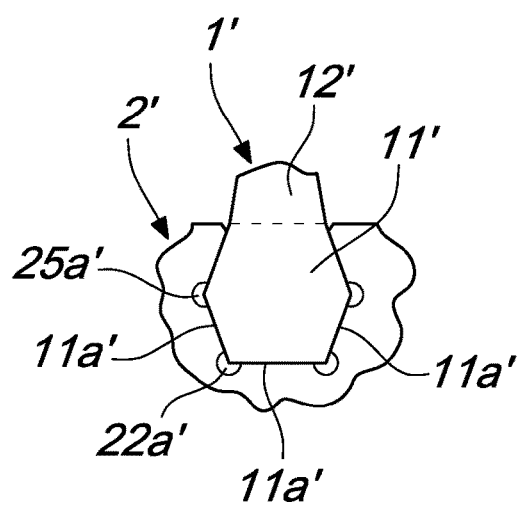
FIG. 11 shows a view from below of a detail of the guide portion and the guide sleeve in an interconnected state.

Preferably, the interior adapter portion 22' has recess portions 25a' at the at least one interior lateral adapter surface 22a', which recess portions are arranged and formed such that opposite edges of the at least one guiding surface 11a' of the guide portion 11' can be inserted in them at least partially such that the edges do not touch the interior adapter portion 22'. The recess portions 25a' facilitate production and fitting of the interior adapter portion 22' with the guide portion 11'. In FIG. 11 such recess portions 25a' are shown exemplarily.

The interior adapter portion 22' with the at least one interior lateral adapter surface 22a' and the at least one guiding surface 11a' of the guide portion 11' are formed complementary such that they can be precisely fitted over each other, forming a connection. The fitting between the at least one interior lateral adapter surface 22a' and the at least one guiding surface 11a' is preferably a press fit or a fit with a play of preferably 0-100 μm or further preferably 0-50 μm or even more preferably 0-30 μm or even more preferably 10-30 μm. The fitting between the at least one interior lateral adapter surface 22a' and the at least one guiding surface 11a' and between the guide portion 11' and the guide sleeve 2' is adapted to be stable enough so that a hole can be drilled in the fixing pin support 1' through the guide sleeve 2' with a predefined tolerance, which hole the fixing pin fits into. Preferably, the tolerance is less than +/−0.5°.

According to the second embodiment of the fixing pin support 1' and the matching guide sleeve 2', the guide sleeve 2' preferably has a handgrip 28' extending laterally from the guide sleeve longitudinal axis so that the guide sleeve 2' can be manually gripped better than would be the case without the handgrip 28'. In FIGS. 9, 10, 13 and 14, the handgrip 28' is shown exemplarily. A second exterior lateral surface 26' of the guide sleeve 2' encompasses the guide sleeve longitudinal axis preferably completely or at least partially. Preferably, a section of the guide sleeve 2' remains open to the outside along the guide sleeve longitudinal axis in a connecting portion with the fixing pin support 11' so that the second lateral surface 26' remains open in this area and the base portion 12' can be inserted therein.

According to the second embodiment of the fixing pin support 1' and the matching guide sleeve 2', the fixing pin support 1' preferably has along the longitudinal axis a first bushing 18' with a bore 18a', where the bushing 18' is made of a harder material than the rest of the fixing pin support 1'. Preferably, the fixing pin support 1' is made of a plastic and the guide sleeve 2' of a metal. Alternatively, the guide sleeve 2' can preferably be made of a plastic and contain a second bushing 27' with a guide channel 21' (shown for instance in FIGS. 9 and 10) inserted therein, which second bushing increases the stability of the guide sleeve 2' for guiding the drill through the guide channel 21'.

Preferably, the fixing pin support 1' can also have pre-bores so that less material needs to be removed from the fixing pin support 1' when the guide bore is provided in combination with the guide sleeve 2', facilitating the drilling of the guide bore. Preferably, the pre-bore is provided in the first bushing 18' as bore 18'.

According to the second embodiment of the fixing pin support 1' and the matching guide sleeve 2', the guide sleeve 2' preferably has a second bushing 27' which extends along the guide sleeve longitudinal axis and has a guide sleeve guide channel 21' along the guide sleeve longitudinal axis which is open to the top and to the bottom on both sides.

According to the second embodiment of the fixing pin support 1' and the matching guide sleeve 2', the fixing pin support 1' is preferably made of a plastic and the guide sleeve 2' preferably of a metal.

According to the second embodiment of the fixing pin support 1' and the matching guide sleeve 2', the cup-shaped interior adapter portion 22' and the guide portion 11' are preferably formed complementary (e.g., to match each other) in such a way that after having been fitted together, they can again be separated. Alternatively preferably, the interior adapter portion 22' and the guide portion 11' are formed complementary such that after having been fitted together, they cannot be manually separated, that is, they remain integrally connected.

According to the second embodiment of the fixing pin support 1' and the matching guide sleeve 2', the base portion 12' of the fixing pin support 1' is preferably integrally connected to the dental prosthesis or cast or screwed therein or glued thereto, or it is milled or cast together with at least one other part of the dental prosthesis 4 together with a basic material.

Figure 13:
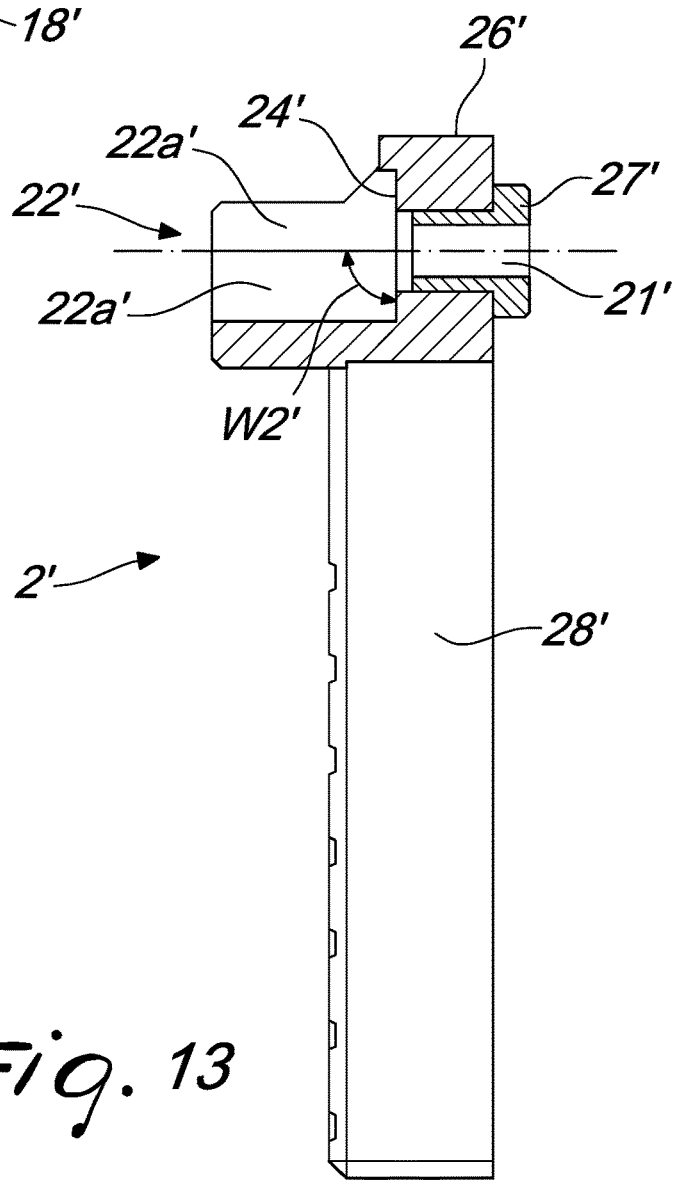
FIG. 13 shows a partly cut lateral view of the guide sleeve with the laterally extended support arm grip according to FIG. 10, center and right; the sectional image showing and interior adapter portion with interior adapter lateral surfaces.
Figure 14:
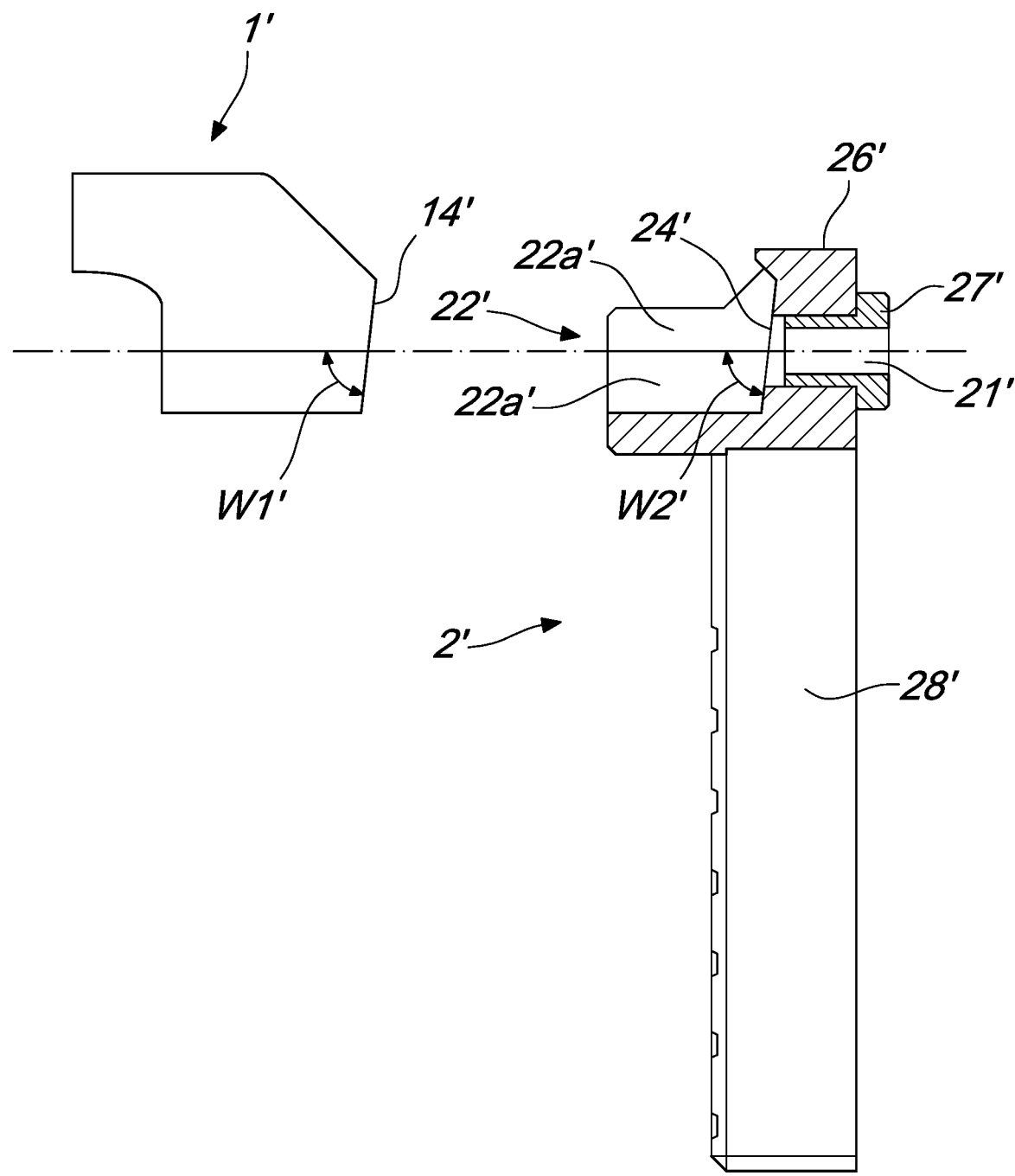
FIG. 14 shows a lateral view of another embodiment of the guide portion, similar to FIG. 12, and a partly cut lateral view of another embodiment of the guide sleeve, similar to FIG. 10 and FIG. 13; the fixing pin support having an upper end face arranged at a first angle to the longitudinal axis, the lower end face of the guide sleeve being arranged at a second angle to the guide sleeve longitudinal axis.

According to the second embodiment of the fixing pin support 1' and the matching guide sleeve 2', the fixing pin support 1' preferably has an upper end face 14' with a first angle W1' with respect to the longitudinal axis, the guide sleeve 2' having a lower end face 24' which is formed like a bevel between the interior adapter portion 22' and the guide channel 21' at a second angle W2' to the guide sleeve longitudinal axis. The upper end face 14' of the fixing pin support 1' and the lower end face 24' of the guide sleeve 2' are formed such with respect to each other that when the guide sleeve 2' is fitted over the fixing pin support 1', they rest against each other, forming a predefined abutment with respect to each other. Preferably, the first and the second angle to the longitudinal axis and to the guide sleeve longitudinal axis, respectively, are right angles of 90° or angles within a range of 60-90° or of 30-60°. In FIG. 13, such an embodiment is shown by way of example with a first angle W1 and a second angle W2 of 90° each. FIG. 14 shows such an embodiment with a first angle W1 and a second angle W2 of approximately 80° each by way of example.

According to the second embodiment of the fixing pin support 1' and the matching guide sleeve 2', the fixing pin support 1' and the guide sleeve 2' are formed such that when fitted together, they are in contact only at the guide portion 11' and at the interior adapter portion 22'.

Preferably, the longitudinal axis of the fixing pin support 1' is in the fitted state generally coaxial with the guide sleeve longitudinal axis.

According to the second embodiment of the fixing pin support 1' and the corresponding guide sleeve 2', the cross-section of the guide portion 11' and the interior adapter cross-section have a shape about the longitudinal axis and the guide sleeve longitudinal axis which is square, hexagonal, star-shaped or polygonal or polygonal in order to secure the connection between the fixing pin support 1 and the guide sleeve 2 against rotation.

According to the second embodiment of the fixing pin support 1' and the corresponding guide sleeve 2', the cross-section of the guide portion 11' and the interior adapter cross-section are formed with rounded edges about the longitudinal axis and the guide sleeve longitudinal axis.

A method for producing a hole in the fixing pin support 1 which can be integrated in a dental prosthesis 4 comprises the following consecutive steps:
  providing the fixing pin support 1 adapted to be able to be integrated in the dental prosthesis 4 and to serve, after a finishing step, for accommodating a respective fixing pin 3 which can be moved in the mouth of a patient through the fixing pin support 1 into the jaw in order to connect the dental prosthesis 4 to the jaw, the fixing pin support 1 having a base portion 12 and an exterior adapter portion 11 and the exterior adapter portion 11 extending to the outside away from the jaw along a longitudinal axis with an exterior adapter cross-section and an exterior adapter length;
  providing a guide sleeve 2 which is formed along a guide sleeve longitudinal axis as a longitudinal sleeve-shaped part with an interior guide channel 21 open to the outside on both sides, and which has an interior cup-shaped interior adapter portion 22 at a first end 20 along the guide sleeve longitudinal axis, which interior adapter portion is formed so as to fit together with the exterior adapter portion 11 in a complementary manner;
  integrating the at least one fixing pin support 1 in the dental prosthesis 4;
  fitting the guide sleeve 2 over the fixing pin support 1 up to a predefined stopping point between the guide sleeve 2 and the fixing pin support 1;
  inserting a drill through the interior guide channel 21 of the guide sleeve 2 and drilling a guide bore through the fixing pin support 1, as the finishing step, in order to allow subsequent passing of the fixing pin 3 through the guide bore;
  after drilling of the guide bore, removing the guide sleeve 2 from the fixing pin support 1;
  after preferred adaptation of the dental prosthesis 4: removal of at least the exterior adapter portion 11 of the fixing pin support 1 extending laterally to the outside, for instance by milling or grinding, preferably to be subsequently used further in the mouth of the patient.

Adjustment of the dental prosthesis 4 is preferably performed by temporarily inserting and fixing the dental prosthesis 4 in the patient's mouth by means of the fixing pins 3 and adjusting the dental prosthesis 4 in the mouth of the patient. This is preferably followed by the steps of removing the dental prosthesis 4 from the mouth of the patient and removing at least the exterior adapter portions 11 of the fixing pin support 1 extending laterally to the outside, for instance by milling or grinding, to be subsequently used further in the mouth of the patient.

An alternative method of producing the hole in the fixing pin support 1, which is already integrated in a dental prosthesis 4, comprises the following consecutive steps:
  manufacturing of the dental prosthesis 4 with the fixing pin supports 1 milled out or molded therein, which are adapted to receive, after a finishing step, a corresponding fixing pin 3 which can be inserted into the jaw of a patient through the fixing pin support 1 so as to connect the dental prosthesis 4 to the jaw, the fixing pin support 1 having a base portion 12 and an exterior adapter portion 11, and the exterior adapter portion 11 extending outwards away from the jaw along a longitudinal axis with an exterior adapter cross-section and an exterior adapter length;
  providing a guide sleeve 2 formed along a longitudinal guide sleeve axis as a longitudinal sleeve-like part having an interior guide channel 21 which is open to the outside on both sides, the guide sleeve having t a first end 20 along the longitudinal guide sleeve axis a cup-shaped interior adapter portion 22 formed so as to fit together with the exterior adapter portion 11;

fitting the guide sleeve 2 on the fixing pin support 1 up to a predefined stop between the guide sleeve 2 and the fixing pin support 1;

inserting a drill through the interior guide channel 21 of the guide sleeve 2 and drilling a guide bore through the fixing pin support 1 as a finishing step in order to allow subsequent passage of the fixing pin 3 through the guide bore;

after drilling of the guide bore, removal of the guide sleeve 2 from the fixing pin support 1;

after preferred adaptation of the dental prosthesis 4: removal, for instance by milling or grinding, of at least the exterior adapter portions 11 of the fixing pin support 1 which protrude laterally outwards, preferably to be subsequently further used in the mouth of the patient.

Adjustment of the dental prosthesis 4 is preferably performed by means of temporary insertion and fixation of the dental prosthesis 4 in the mouth of the patient by means of the fixing pins 3 and adaptation of the dental prosthesis 4 in the mouth of the patient. This is preferably followed by the following steps: removal of the dental prosthesis 4 from the mouth of the patient and removal, for instance by milling or grinding, of at least the exterior adapter portions 11 of the fixing pin support 1 which protrude laterally outwards, to be subsequently further used in the mouth of the patient.

A special advantage of the two methods described above is that the guide bores can be better drilled into the fixing pin supports 1 through the temporarily fitted guide sleeves 2 than without them. This allows both a more precise drilling of the guide bores into the fixing pin supports 1 and an easier and quicker removal of the ends of the fixing pin supports 1 which protrude outwards, when the guide bores are no longer needed.

Corresponding to the second embodiment of the fixing pin support 1' with the respective guide sleeve 2', a suitable method according to the invention of producing the hole in the fixing pin support 1' which can be integrated in the dental prosthesis 4' comprises the following steps:

providing the fixing pin support 1' adapted to be able to be integrated in the dental prosthesis 4' and to receive a corresponding fixing pin 3, preferably after a finishing step has been performed, which can be moved into the jaw of a patient through the fixing pin support 1' so as to connect the dental prosthesis 4' to the jaw. The fixing pin support 1' has the base portion 12' and the guide portion 11' and the guide portion 11' extends along its longitudinal axis with the at least one guiding surface 11a' and with the guide portion length outwards away from the jaw along the longitudinal axis; preferably, the at least one guiding surface 11a' is planar;

providing the guide sleeve 2' which is formed along the guide sleeve longitudinal axis as a longitudinal part with the interior guide channel 21' which is open to the outside on both sides and has the cup-shaped interior adapter portion 22' along the longitudinal guide sleeve axis. The interior adapter portion 22' is adapted to fit over the guide portion 11' and to connect it to the guide sleeve 2', securing them against rotation;

integrating the at least one fixing pin support 1' in the dental prosthesis 4';

fitting the guide sleeve 2' over the fixing pin support 1' up to a predefined stop between the guide sleeve 2' and the fixing pin support 1;

optionally inserting the drill through the interior guide channel 21' of the guide sleeve 2' and drilling the guide bore through the fixing pin support 1' as the finishing step; the guide bore allows subsequent passage of the fixing pin 3;

after drilling of the guide bore: removing the guide sleeve 2' from the fixing pin support 1';

after adjustment of the dental prosthesis 4': removing at least the guide portion 11' of the fixing pin support 1' which protrudes laterally outwards, preferably to be subsequently used further in the mouth of the patient.

Method of producing the hole in the fixing pin support 1' integrated in the dental prosthesis 4', comprising the following steps:

manufacturing of the dental prosthesis 4' with the fixing pin support 1' milled out or molded therein, which is adapted to receive, preferably after a finishing step, the corresponding fixing pin 3 which can be inserted into the jaw of a patient through the fixing pin support 1' so as to connect the dental prosthesis 4 to the jaw. The fixing pin support 1' has the base portion 12' and the guide portion 11', and the guide portion 11' extends along its longitudinal axis with the at least one guiding surface 11a' and with the guide portion length away from the jaw outwards along the longitudinal axis; preferably, the at least one guiding surface 11a' is planar;

providing the guide sleeve 2' which is formed along the guide sleeve longitudinal axis as a longitudinal sleeve-like part with the interior guide channel 21' which is open to the outside on both sides and has a cup-shaped interior adapter portion 22' along the longitudinal guide sleeve axis. The interior adapter portion 22' is adapted to fit over the exterior adapter portion 11' and to connect the guide portion 11' to the guide sleeve 2', securing them against rotation;

fitting the guide sleeve 2' over the fixing pin support 1' up to the predefined stop between the guide sleeve 2' and the fixing pin support 1;

optionally inserting the drill through the interior guide channel 21' of the guide sleeve 2' and drilling through the fixing pin support 1' as the finishing step; the guide bore allows subsequent passage of the fixing pin 3;

after drilling of the guide bore: removing the guide sleeve 2' from the fixing pin support 1';

After adjustment of the dental prosthesis 4': removing at least the guide portion 11' of the fixing pin support 1' which protrudes laterally outwards, preferably to be subsequently used further in the mouth of the patient.

For purposes of clarity, it is mentioned that the dental prosthesis 4, 4' can have one or more fixing pin supports 1, 1', over each of which the corresponding guide sleeve 2, 2' can be fitted.

For purposes of clarity, the at least one guiding surface 11a' and/or the exterior lateral adapter surface 11a can be planar.

For purposes of clarity, the guide channel 21, 21' is formed so that when it is in the fitted state, the drill can be guided between the guide sleeve 2, 2' and the fixing pin support 1, 1' in order to form the guide bore in the fixing pin support 1, 1' in a predefined manner.

For purposes of clarity, it is mentioned that the fixing pin support 1, 1' does not comprise the guide bore from the very beginning, but only after the guide sleeve 2, 2' has been fitted over the fixing pin support 1, 1' and the guide bore has been drilled into the fixing pin support 1, 1' by means of a drill which is guided through the guide sleeve 2, 2'. After this, the guide sleeve 2, 2' is preferably no longer needed on the fixing pin support 1 and preferably removed from it.

For purposes of clarity, it is mentioned that the word "fit" is to be understood in the sense that the guide sleeve 2, 2' preferably can be applied snugly on the fixing pin support 1, 1' and preferably can also be removed from it. Preferably, this removal can take place manually.

For purposes of clarity, it is mentioned that the terms "upper" and "lower" are intended to mean relative positions in the vertical direction, as shown in FIGS. 1, 3, 4, 5, 6a-6d, 7, 8 and 9. For purposes of clarity, it is mentioned that the term "lateral" is intended to mean relative positions in the horizontal direction, as shown in FIGS. 1, 3, 4, 5, 6a-6d, 7, 8 and 9, or preferably substantially perpendicular to the respective longitudinal axis or longitudinal guide sleeve axis. The longitudinal axis and/or the longitudinal guide sleeve axis are shown by dashed and dotted lines, for instance in FIGS. 7, 10, 13 and 14.

For purposes of clarity, it is also mentioned that the indefinite article "a" in combination with an object is not intended to limit the number of objects to exactly "one" object, but that "at least one" object is intended. This applies to all indefinite articles, e.g. "a" etc.

Other possible embodiments are described in the following Claims. In particular, the various features of the embodiments described above can also be combined, unless they are mutually exclusive from a technical viewpoint.

The reference numbers indicated in the Claims are only provided for better comprehensibility and in no way limit the Claims to the embodiments shown in the Figures.

LIST OF REFERENCE NUMBERS

1, 1' fixing pin support
10 first end of fixing pin support
10A' lower end
11 exterior adapter portion
11' guide portion
11a exterior lateral adapter surface
11a' guiding surface
12, 12' base portion
13 first end face
14 second end face
14' upper end face of fixing pin support
15 first lateral surface
16, 16' exterior end
17 exterior adapter end edge
18' first bushing
18a' bore of first bushing
2, 2' guide sleeve which is a fixing pin guide sleeve
20 first end of guide sleeve
21, 21' guide channel
22' interior adapter portion
22a' interior lateral adapter surface
23 third end face
24 fourth end face
24' lower end face of guide sleeve
25 recess
25a' recess portion
26, 26' second lateral surface
27' second bushing
28' support arm grip
3 fixing pin
4, 4' dental prosthesis
B11' area of base portion
B12' area of fixing pin support
W1' first angle
W2' second angle

The invention claimed is:

1. An assembly comprising:
    a fixing pin support adapted to be integrated, or able to be integrated, in a dental prosthesis; and
    a matching guide sleeve that is attachable to and detachable from the fixing pin support and has a shape extending longitudinally along a guide sleeve longitudinal axis between a first end and a second end,
    the fixing pin support comprising:
        a base portion adapted to be integrally connectable to the dental prosthesis or monolithic with the dental prosthesis; and
        an exterior adapter portion which is integrally connected to the base portion and has an exterior adapter length extending along a longitudinal axis of the fixing pin support from the base portion to an exterior end with an exterior adapter cross-section, wherein, in a state in which the fixing pin support is integrated in the dental prosthesis and the dental prosthesis is provided in a patient, the exterior adapter portion is adapted to extend from the base portion to the exterior end in an outward direction away from the dental prosthesis and the patient; and
    the matching guide sleeve including:
        an interior guide channel which is open to an outside at the first end and the second end of the matching guide sleeve, and
        a cup-shaped interior adapter portion at the first end of the matching guide sleeve, the cup-shaped interior adapter portion having an interior adapter length and an interior adapter cross-section, the cup-shaped interior adapter portion including an opening at the first end of the matching guide sleeve, wherein the first end is configured to face in a direction towards a jaw of the patient when the matching guide sleeve is coupled to the fixing pin support in the state in which the fixing pin support is integrated in the dental prosthesis and the dental prosthesis is provided in the patient;
    wherein:
        the fixing pin support is configured to have a hole drilled therein by a drill inserted through the matching guide sleeve acting as a drill guide for insertion of a fixing pin to couple the fixing pin support to a jaw of the patient, and
        the cup-shaped interior adapter portion with the interior adapter length and the interior adapter cross-section matches the exterior adapter portion with the exterior adapter length and the exterior adapter cross-section such that the cup-shaped interior adapter portion and the exterior adapter portion are configured to be fitted together to form a connection which is sufficiently stable for the hole to be drilled in the fixing pin support by the drill inserted through the matching guide sleeve acting as the drill guide with a predefined tolerance.

2. The assembly according to claim 1, wherein the fixing pin support is formed of a plastic and the matching guide sleeve is formed of a metal, and/or the fixing pin support includes a first bushing with a bore along the longitudinal axis and the first bushing is made of a harder material than a remainder of the fixing pin support.

3. The assembly according to claim 1, wherein the cup-shaped interior adapter portion and the exterior adapter portion match each other such that the cup-shaped interior adapter portion and the exterior adapter portion can be separated again after having been fitted together.

4. The assembly according to claim 1, wherein the base portion of the fixing pin support is:
- integrally connected to the dental prosthesis,
- molded with the dental prosthesis,
- screwed into the dental prosthesis,
- glued into the dental prosthesis, or
- milled or molded together with a part of the dental prosthesis from a basic material.

5. The assembly according to claim 1, wherein:
- the fixing pin support includes a first end face on the base portion, the first end face being oriented at a first angle relative to the longitudinal axis and extending annularly around the exterior adapter portion, wherein the exterior adapter portion extends out of the base portion;
- the matching guide sleeve includes an annular third end face around the longitudinal guide sleeve axis, wherein the annular third end face is formed at the first end of the matching guide sleeve between a second lateral surface and the cup-shaped interior adapter portion, and the annular third end face is oriented at the first angle to the longitudinal guide sleeve axis; and
- the first end face and the third end face are formed with respect to each other such that in a fitted state of the matching guide sleeve and the fixing pin support, the first end face and the third end face rest against each other and form a predefined stop with respect to one another.

6. The assembly according to claim 5, wherein the matching guide sleeve includes a recess at the first end which is formed annularly around the longitudinal guide sleeve axis between the third end face and the cup-shaped interior adapter portion such that the recess widens at an exterior rim portion of the cup-shaped interior adapter portion at the first end by a recess width so that in the fitted state between the matching guide sleeve and the fixing pin support, the recess forms a cavity with an annular width and a depth along the longitudinal guide sleeve axis which is smaller than the interior adapter length.

7. The assembly according to claim 5, wherein the first angle to the longitudinal axis and to the guide sleeve longitudinal axis is a right angle or an angle within a range from 60-90°.

8. The assembly according to claim 5, wherein the matching guide sleeve is configured to contact the exterior adapter portion by the cup-shaped interior adapter portion and/or by the first end face and/or by the third end face.

9. The assembly according to claim 1, wherein:
- the fixing pin support includes, at the exterior end of the exterior adapter portion, a second end face at a second angle to the longitudinal axis;
- the matching guide sleeve includes a fourth end face formed as a slant between the first end and the second end of the matching guide sleeve, the cup-shaped interior adapter portion extending between the first end of the matching guide sleeve and the fourth end face along the guide sleeve longitudinal axis, the fourth end face being oriented at the second angle to the guide sleeve longitudinal axis; and
- the second end face and the fourth end face are formed with respect to each other such that when the matching guide sleeve and the fixing pin support are fitted together, the second end face and the fourth end face rest against each other and form a predefined abutment with respect to each other.

10. The assembly according to claim 9, wherein the second angle to the longitudinal axis and to the guide sleeve longitudinal axis is a right angle or an angle within a range from 60-90° or from 30-60°.

11. The assembly according to claim 9, wherein in a fitted state between the fixing pin support and the matching guide sleeve, the fixing pin support and the matching guide sleeve are adapted to contact each other exclusively at areas defined by the exterior adapter portion, by the interior adapter portion and/or by the second end face and/or by the fourth end face.

12. The assembly according to claim 1, wherein the exterior adapter cross-section and accordingly the interior adapter cross-section are:
- formed to prevent rotation of the fixing pin support and the matching guide sleeve with respect to each other about the longitudinal axis and the guide sleeve longitudinal axis, or
- square, oval, star-shaped or polygonal with rounded edges, in order to secure the connection between the fixing pin support and the matching guide sleeve against rotation.

13. The assembly according to claim 1, wherein the fixing pin support has an upper end face where the fixing pin support and the matching guide sleeve meet, and the upper end face is free of apertures.

14. The assembly according to claim 1, wherein the base portion is monolithic with the dental prosthesis.

15. An assembly comprising:
- a fixing pin support adapted to be integrated, or able to be integrated, in a dental prosthesis; and
- a matching guide sleeve that is attachable to and detachable from the fixing pin support and has a shape extending longitudinally, the fixing pin support comprising:
- a guide portion which extends along a longitudinal axis of the fixing pin support and surrounds the longitudinal axis on all sides, the guide portion including at least one guiding surface and a guide portion length along the longitudinal axis; and
- a base portion which is connected integrally or monolithically with the guide portion and extends laterally away from the guide portion outside the at least one guiding surface, the base portion being adapted to be integrally connectable to the dental prosthesis or monolithic with the dental prosthesis; and the matching guide sleeve including:
- an interior guide channel extending along a guide sleeve longitudinal axis between a first end and a second end of the matching guide sleeve, the interior guide channel being open to an outside at the first end and the second along the guide sleeve longitudinal axis; and
- a cup-shaped interior adapter portion arranged in a portion of the matching guide sleeve along the guide sleeve longitudinal axis, the cup-shaped interior adapter portion having an interior adapter cross-section and an interior adapter length, the cup-shaped interior adapter portion including an opening at the first end of the matching guide sleeve, wherein the first end is configured to face in a direction towards a jaw of a patient when the matching guide sleeve is coupled to the fixing pin support in a state in which the fixing pin support is integrated in the dental prosthesis and the dental prosthesis is provided in the patient;

wherein:
the fixing pin support is configured to have a hole drilled therein by a drill inserted through the matching guide sleeve acting as a drill guide for insertion of a fixing pin to couple the fixing pin support to a jaw of a patient, and
the cup-shaped interior adapter portion with the interior adapter length and the interior adapter cross-section matches the guide portion with the at least one guiding surface and the guide portion length such that the cup-shaped interior adapter portion and the guide portion can be fitted together along the longitudinal axis and simultaneously along the guide sleeve longitudinal axis to form a connection between the fixing pin support and the matching guide sleeve that is secure against rotation of the matching guide sleeve relative to the fixing pin support, and such that the hole can be drilled by the drill inserted through the matching guide sleeve acting as the drill guide into the fixing pin support.

16. The assembly according to claim 15, wherein the matching guide sleeve includes a support arm grip protruding laterally from the guide sleeve longitudinal axis for manual retention of the matching guide sleeve.

17. The assembly according to claim 15, wherein the fixing pin support includes a first bushing with a bore along the longitudinal axis and the first bushing being made of a harder material than a remainder of the fixing pin support.

18. The assembly according to claim 15, wherein the matching guide sleeve includes a second bushing which extends along the guide sleeve longitudinal axis and includes a guide sleeve guide channel along the guide sleeve longitudinal axis which is open on both sides.

19. The assembly according to claim 15, wherein the fixing pin support is made of a plastic and the matching guide sleeve is made of a metal.

20. The assembly according to claim 15, wherein the cup-shaped interior adapter portion matches the guide portion such that the cup-shaped interior adapter portion and the guide portion can be separated after having been fitted together.

21. The assembly according to claim 15, wherein the base portion of the fixing pin support is:
integrally connected to the dental prosthesis,
molded with the dental prosthesis,
screwed into the dental prosthesis,
glued into the dental prosthesis, or
milled or molded together with at least one part of the dental prosthesis from a basic material.

22. The assembly according to claim 15, wherein:
the fixing pin support includes an upper end face at a first angle to the longitudinal axis and the matching guide sleeve includes a lower end face formed as a slant between the first end and the second end of the matching guide sleeve, the cup-shaped interior adapter portion extending between the first end of the matching guide sleeve and the lower end face along the guide sleeve longitudinal axis, the lower end face being oriented at a second angle to the guide sleeve longitudinal axis; and
the upper end face of the fixing pin support and the lower end face of the matching guide sleeve are formed with respect to each other such that when the matching guide sleeve is fitted over the fixing pin support, the upper end face and the lower end face rest against each other, forming a predefined abutment with respect to each other.

23. The assembly according to claim 22, wherein the first angle to the longitudinal axis and the second angle to the guide sleeve longitudinal axis are a right angle or an angle within a range from 60-90° or from 30-60°.

24. The assembly according to claim 15, wherein the fixing pin support and the matching guide sleeve are formed such that, in a fitted state between the matching guide sleeve and the fixing pin support, the matching guide sleeve and the fixing pin support contact each other exclusively at areas defined by the guide portion and by the cup-shaped interior adapter portion.

25. The assembly according to claim 15, wherein a cross-section of the guide portion and the interior adapter cross-section have a square, hexagonal, oval, star, or polygonal shape about the longitudinal axis and the guide sleeve longitudinal axis in order to secure the connection between the fixing pin support and the matching guide sleeve against rotation.

26. The assembly according to claim 25, wherein the cross-section of the guide portion and the interior adapter cross-section are formed with rounded edges about the longitudinal axis and the guide sleeve longitudinal axis.

27. The assembly according to claim 15, wherein the fixing pin support has an upper end face where the fixing pin support and the matching guide sleeve meet, and the upper end face is free of apertures.

28. The assembly according to claim 15, wherein the base portion is monolithic with the dental prosthesis.

* * * * *